United States Patent [19]

Brennan et al.

[11] Patent Number: 5,510,934
[45] Date of Patent: Apr. 23, 1996

[54] MEMORY SYSTEM INCLUDING LOCAL AND GLOBAL CACHES FOR STORING FLOATING POINT AND INTEGER DATA

[75] Inventors: John Brennan, Mountain View; Peter Y. Hsu, Fremont; William A. Huffman, Los Gatos; Paul Rodman, Palo Alto; Joseph T. Scanlon, Sunnyvale; Man K. Tang, Milpitas, all of Calif.; Steve J. Ciavaglia, Williston, Vt.

[73] Assignee: Silicon Graphics, Inc., Mountain View, Calif.

[21] Appl. No.: 168,832

[22] Filed: Dec. 15, 1993

[51] Int. Cl.$^6$ .......................... G06F 12/00; G06F 13/00
[52] U.S. Cl. .................. 395/446; 395/449; 395/467; 395/469; 395/471; 364/DIG. 1
[58] Field of Search .................. 395/425, 375, 395/400, 445, 446, 447, 448, 449, 450, 467, 496, 468, 469, 470, 471, 403, 405

[56] References Cited

U.S. PATENT DOCUMENTS

| | | | |
|---|---|---|---|
| 4,774,659 | 9/1988 | Smith et al. | 395/400 |
| 4,928,225 | 5/1990 | McCarthy et al. | 395/425 |
| 5,014,195 | 5/1991 | Farrell et al. | 395/425 |
| 5,051,885 | 9/1991 | Yates, Jr. et al. | 395/375 |
| 5,155,816 | 10/1992 | Kohn | 395/375 |
| 5,214,765 | 5/1993 | Jensen | 395/425 |
| 5,307,477 | 4/1994 | Taylor et al. | 395/425 |

FOREIGN PATENT DOCUMENTS 0459232   12/1991   European Pat. Off. .

OTHER PUBLICATIONS

Hot Chips IV Symposium, Stanford University, Aug. 9–11, 1992, Message from the Program Chairs, Message from the General Chair, Sunday tutorial schedule, Monday schedule, Tuesday schedule, and pp. 1.2.1–1.2.13.

Hot Chips V Symposium, Stanford University, Aug. 8–10, 1993, Message from the General Chair, Message from the Program Co–Chairs, Sunday tutorial schedule, Monday schedule, Tuesday schedule, and pp. 8.1.1–8.1.9.

Hot Chips V Symposium, Stanford University, Aug. 8–10, 1993,Message from the General Chair, Message from the Program Co–Chairs, Sunday tutorial schedule, Monday schedule, Tuesday schedule, and pp. 1.3.1–1.3.12.

Case, B. "IBM Delivers First PowerPC Microprocessor" *Microprocessor Report The Insider's Guide to Microprocessor Hardware* vol. 6, No. 14, pp. 5–10, Oct. 28, 1992.

Case, B. "Intel Reveals Pentium Implementation Details" *Microprocessor Report* pp. 9–17, Mar. 29, 1993.

Case, B., et al. "DEC Enters Microprocessor Business with Alpha" *Microprocessor Report The Insider's Guide to Microprocessor Hardware*, vol. 6, No. 3, pp. 5–14, Mar. 4, 1992.

Slater, M. "Second–Generation i860 Permiers as i860XP" *Microprocessor Report The Insider's Guide to Microprocessor Hardware*, vol. 5, No. 11, pp. 5–9, Jun. 12, 1991.

*Primary Examiner*—Glenn Gossage
*Attorney, Agent, or Firm*—Sterne, Kessler, Goldstein & Fox

[57] ABSTRACT

A split level cache memory system for a data processor includes a single chip integer unit, an army processor such as a floating point unit, an external main memory and a split level cache. The split level cache includes an on-chip, fast local cache with low latency for use by the integer unit for loads and stores of integer and address data and an off-chip, pipelined global cache for storing arrays of data such as floating point data for use by the array processor and integer and address data for refilling the local cache. Coherence between the local cache and global cache is maintained by writing through to the global cache during integer stores. Local cache words are invalidated when data is written to the global cache during an army processor store.

5 Claims, 6 Drawing Sheets

MEMORY SYSTEM INCLUDING LOCAL AND GLOBAL CACHES FOR STORING FLOATING POINT AND INTEGER DATA

BACKGROUND OF THE INVENTION

1. Field of the Invention

The present invention relates generally to memory systems utilized by high-speed data processors and more particularly relates to a memory hierarchy including high-speed data caches.

2. Related Art

Super-computers operating at billions of floating point operations per second (gigaflops) based on microprocessor architectures are entering the marketplace.

Although supercomputers are usually characterized by their impressive floating-point compute speed, memory size and bandwidth also differentiates them from other computers. Each floating point operation (flop) requires between one and three memory accesses per operation. Accordingly, a several hundred megaflop microprocessor requires a memory hierarchy capable of delivering gigabytes per second of bandwidth.

Pipelined memories are available that provide sufficiently high bandwidth. However, it is well-known that the latency associated with these memories directly impacts the execution speed of integer programs such as operating systems and compilers as well as the scaler portion of floating point programs. These programs prefer to access integer and address data directly from a short latency memory device such as a small on-chip cache.

Accordingly, the conflicting demands of integer and floating point operations provide a major challenge to designing microprocessor based supercomputers.

SUMMARY OF THE INVENTION

The present invention is a split level cache including a small, short latency local cache for storing integer and address data and a large, higher latency global cache for storing floating point data or data required by an array processor. The local cache is a subset of the global cache (i.e., the data stored in the local cache is a subset of the data stored in the global cache) and is the primary cache for the integer unit. The global cache stores arrays of data for use by a floating point unit or an array processor and is the primary cache for the floating point unit or array processor and secondary cache for the integer unit.

According to one aspect of the invention, stores by the floating point unit or array processor are written only to the global cache thereby causing lack of coherency with the local cache. This incoherency is tracked by attaching a valid bit to each word in a cache line stored in the local cache and resetting the valid bit corresponding to a given word that is modified in the global cache during a floating point store operation.

According to another aspect of the invention, stores by the integer unit to the local cache are written through to the global cache to avoid incoherency. The valid bit corresponding to a word in the local cache modified by an integer store operation is set to indicate coherency.

According to another aspect of the invention, the global cache is set associative and includes odd and even banks of interleaved data stores to permit access of both banks simultaneously.

According to another aspect of the invention, the global cache is a pipelined cache and includes a set select signal stage that encodes a set select signal based on stored tags during a single machine cycle.

Other features and advantages will be apparent in view of the appended drawings and following detailed description.

DETAILED DESCRIPTION OF THE PREFERRED EMBODIMENTS

Figure 1:
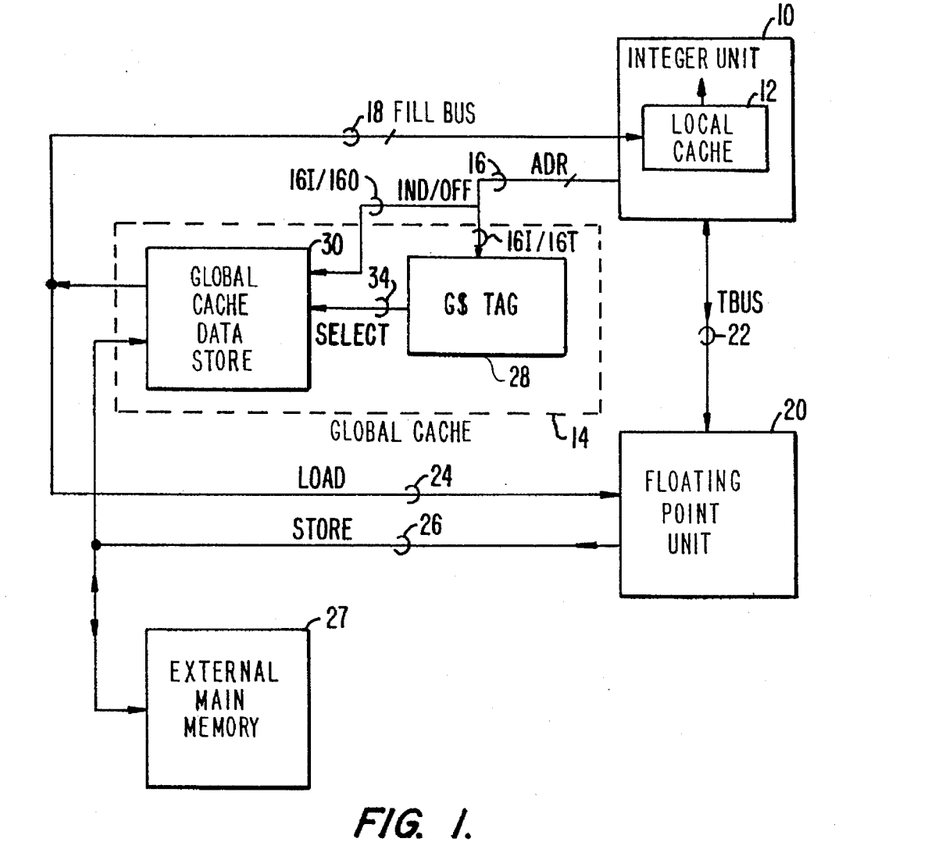
FIG. 1 is a high-level block diagram of the split level cache system depicting the interconnections between the local cache, the global cache, the floating point unit, the integer unit, and the external main memory.

FIG. 1 is a block diagram depicting a preferred embodiment of the present invention comprising a small high-speed, non-pipelined on-chip cache having low latency for providing integer and address data to an integer unit and a large off-chip, pipelined cache for providing floating point data to a floating point unit.

In FIG. 1, an integer unit (IU) 10 includes on the same chip a first level local cache (hereafter local cache) 12. An address output of the IU 10 is coupled to an off-chip second level global cache (hereafter global cache) 14 by an address bus 16. A data input port$_{LC}$ of the local cache 12 is coupled to a data output port$_{GC}$ of the global cache 14 by a FILL bus 18.

An instruction port of the IU 10 is coupled to an instruction port of a floating point unit (FPU) 20 by a TBUS 22. The data input port$_{FPU}$ of the FPU 20 is coupled to the data output port$_{GC}$ of the global cache 14 by LOAD bus 24. The data output port$_{FPU}$ Of the FPU 20 is coupled to the data input port$_{GC}$ of the global cache 14 by a STORE bus 26.

The data input port$_{GC}$ of global cache 14 is further coupled to the data input/output port of external main memory 27. The data output port$_{FPU}$ of the FPU 20 is also coupled to the data input/output port of external main memory 27.

The global cache 14 includes a global cache tag store 28 and a global cache data store 30. The address bus 16 includes an OFFSET bus 16O for carrying low order address bits, an INDEX bus 16I for carrying higher order address bits, and a TAG bus 16T for the TAG field bits. The INDEX bus 16I and TAG bus 16T are coupled to the address inputs of global cache tag store 28. The INDEX and OFFSET buses 16I and 16O are coupled to the address inputs of the global cache data store 30. The set select signal of the global cache tag store 28 is coupled to a set address input of the global cache data store 30 by a SELECT bus 34.

A control unit generates timing and control signals for controlling data transfers. This control unit, which is implemented utilizing standard technology, is not part of the invention and is not shown in the drawings.

Figure 2:
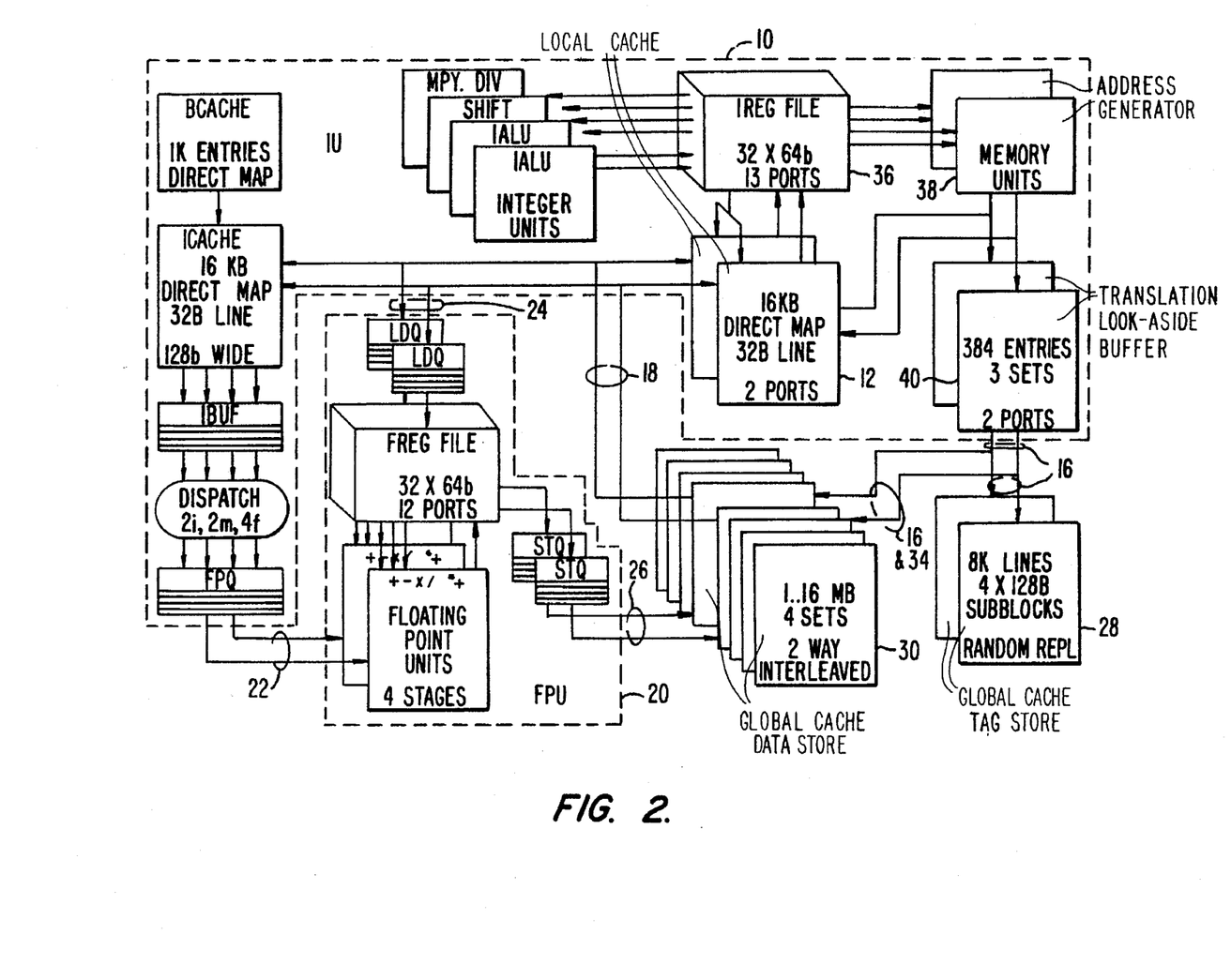
FIG. 2 is a more detailed diagram of the system disclosed in FIG. 1.

FIG. 2 is a more detailed diagram of the embodiment depicted in FIG. 1. From FIG. 2, the IU 10 and FPU 20 are implemented as single chips with local cache 12 included on the IU. In the preferred embodiment, the IU 10 is a RISC type processor that executes all data processing instructions on data stored in a register file 36. Processed data held in register file 36 is transferred from the register file (i.e., through data output port$_{IU}$) to the local cache 12 (i.e., through data input port$_{LC}$) during store operations. Similarly, data held in local cache 12 is transferred from the local cache (i.e., through data output port$_{LC}$) to register file 36 (i.e., through data input port$_{IU}$) during load operations.

An address generator (AGEN) 38 in the IU generates virtual addresses which are utilized to address the local cache 12. These virtual addresses are fed to an address translator which generates the physical addresses used to access data in the external main memory. The address translator in the preferred embodiment is a translation lookaside buffer (TLB) 40.

In the memory hierarchy of the preferred embodiment, a virtual memory storing all data that can be accessed by the data processor is addressed by virtual addresses generated by the AGEN 38. The data held in the external main memory 27 is a subset of the data held in the virtual memory and is addressed by physical addresses generated by the TLB 40. The data held in the global cache 14 is a subset of the data held in external main memory 27 and is addressed by the INDEX and OFFSET fields of the physical address output by the TLB 40 and a set select signal output by the global cache tag store 28. The data held in the local cache 12 is a subset of the data held in the global cache 14. The data cache 12 is accessed by the INDEX and OFFSET fields of the virtual address generated by the AGEN 38 and is physically tagged.

As described more fully below, the global cache tag store 28 is implemented utilizing tag random access memory (RAM) chips and the global cache data store 30 is implemented utilizing commodity synchronous static RAMs (SSRAMs) organized as a 4-way set associative cache. The set select signal output by the global cache tag store 28 selects one of the four associative sets. Additionally, the global cache data store 30 is organized as an interleaved memory having odd and even banks that can be simultaneously accessed to increase bandwidth.

Figure 3:
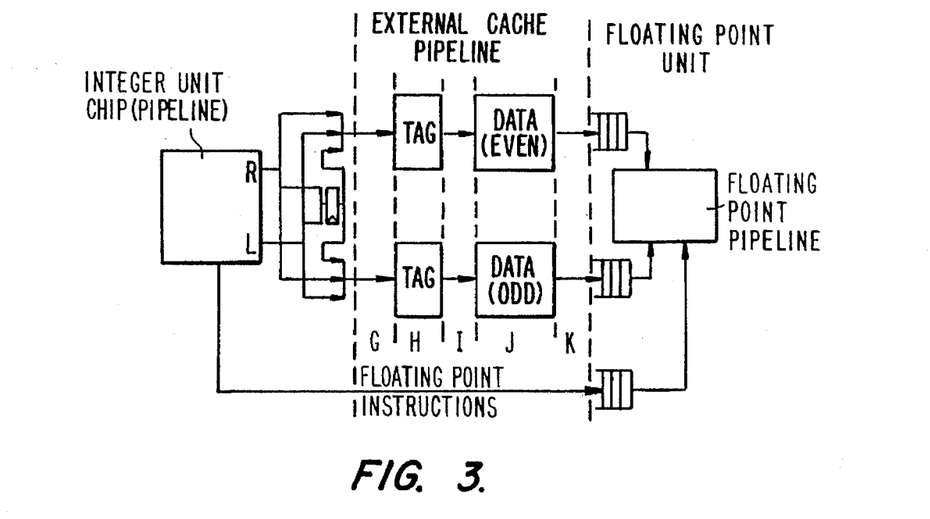
FIG. 3 is a high-level diagram of the pipelined architecture of the off-chip global cache.
Figure 4:
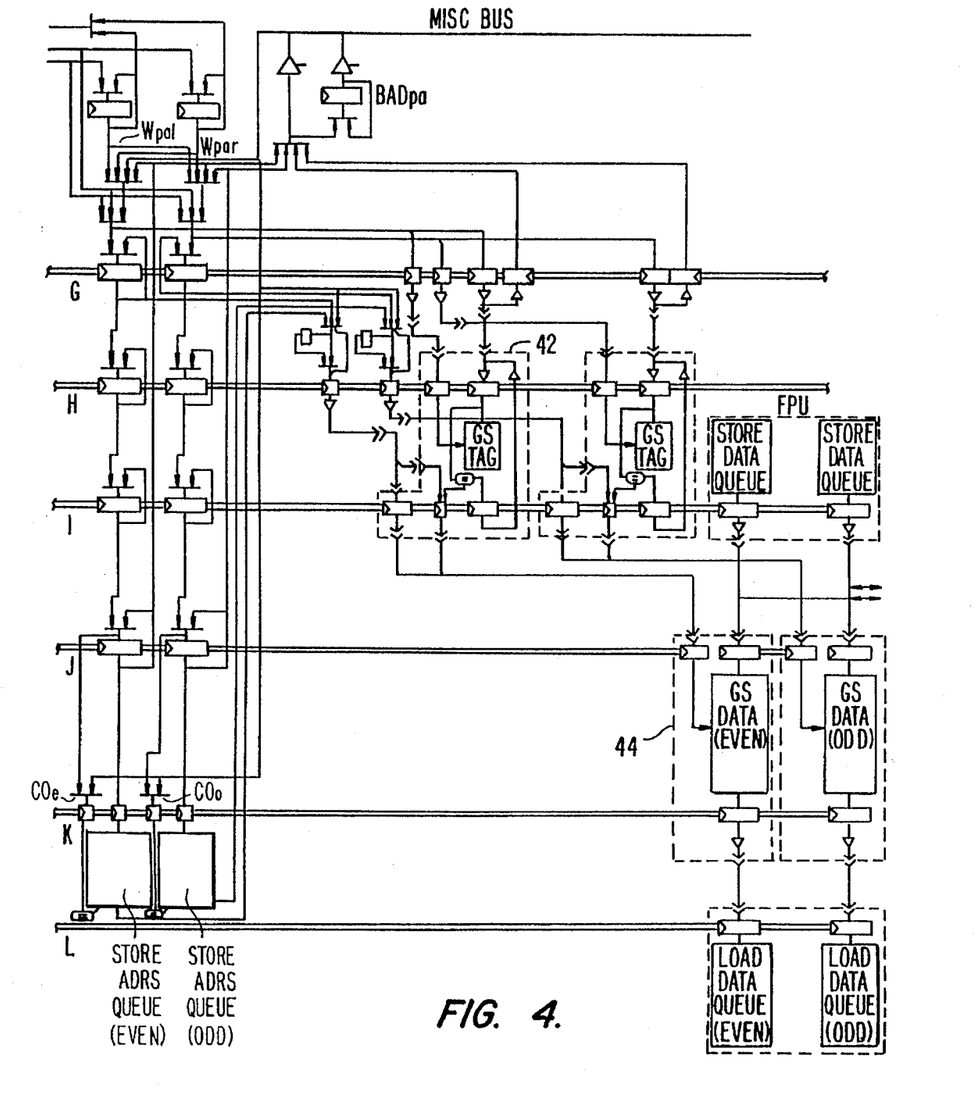
FIG. 4 is a more detailed diagram of the pipelined architecture depicted in FIG. 3.

The global cache pipeline has five stages (labeled G, H, I, J, and K) which are depicted at a high level in FIG. 3 and in greater detail in FIG. 4. The processing at each stage is completed in one machine cycle.

Referring now to FIGS. 3 and 4, addresses are sent from the IU chip to the tag RAM chips during the G stage. The tags are looked up and hit/miss information is encoded into a set select signal during the H stage. Each 4-way set associative tag RAM encodes set information into 2 bits. The encoded information from the tag RAMs 42 is fed to global cache data store SSRAMs 44 during the I stage.

Each global cache data store SSRAM 44 is accessed internally during the J stage. The SSRAMs integrate input and output registers onto the chip, thus pipelining a RAM access into three cycles, i.e., address setup, RAM access, and data output cycles. Finally, the accessed data is sent back to the IU and the FPU from the SSRAM chips 44 during the K stage.

A full cycle is allocated to "chip crossings" during the I and K stages because transistor-transistor logic (TTL) drivers with significant loading at the target frequency of 75 megahertz (MHz) require almost an entire cycle.

Figure 5:
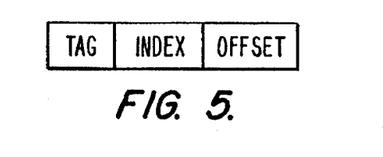
FIG. 5 is a diagram depicting the format of a physical address.

The tag RAMs 42 utilized during the H stage of the global cache pipeline will now be described with reference to FIGS. 5 and 6. The general format of a physical address is depicted in FIG. 5. Each address includes a TAG field, an INDEX field, and an OFFSET field. As is well known in the art, the INDEX and OFFSET fields are used to physically address data within the cache. The INDEX field accesses a particular set, with each set comprising 4 cache lines. If the line containing the data being accessed is in the cache, it will be one of these four accessed lines. The TAG associated with the line being accessed is compared to the TAG associated with each of these 4 cache lines to determine if the cache contains the data of interest. If a match occurs, the OFFSET field indicates which word within the identified line corresponds to the accessed data.

As stated above, the preferred embodiment is 4-way set associative memory. A line in the external main memory having a given INDEX field may be mapped into one of a set of 4 lines in the cache accessed by the given INDEX. In the preferred embodiment, the two higher order bits of the cache address are utilized as set select signal data and the remaining address bits function as the INDEX field. For each indexed set in the global cache data store 30, four TAG fields are stored in the global cache tag store 28 at a location accessed by an INDEX field.

Figure 6:
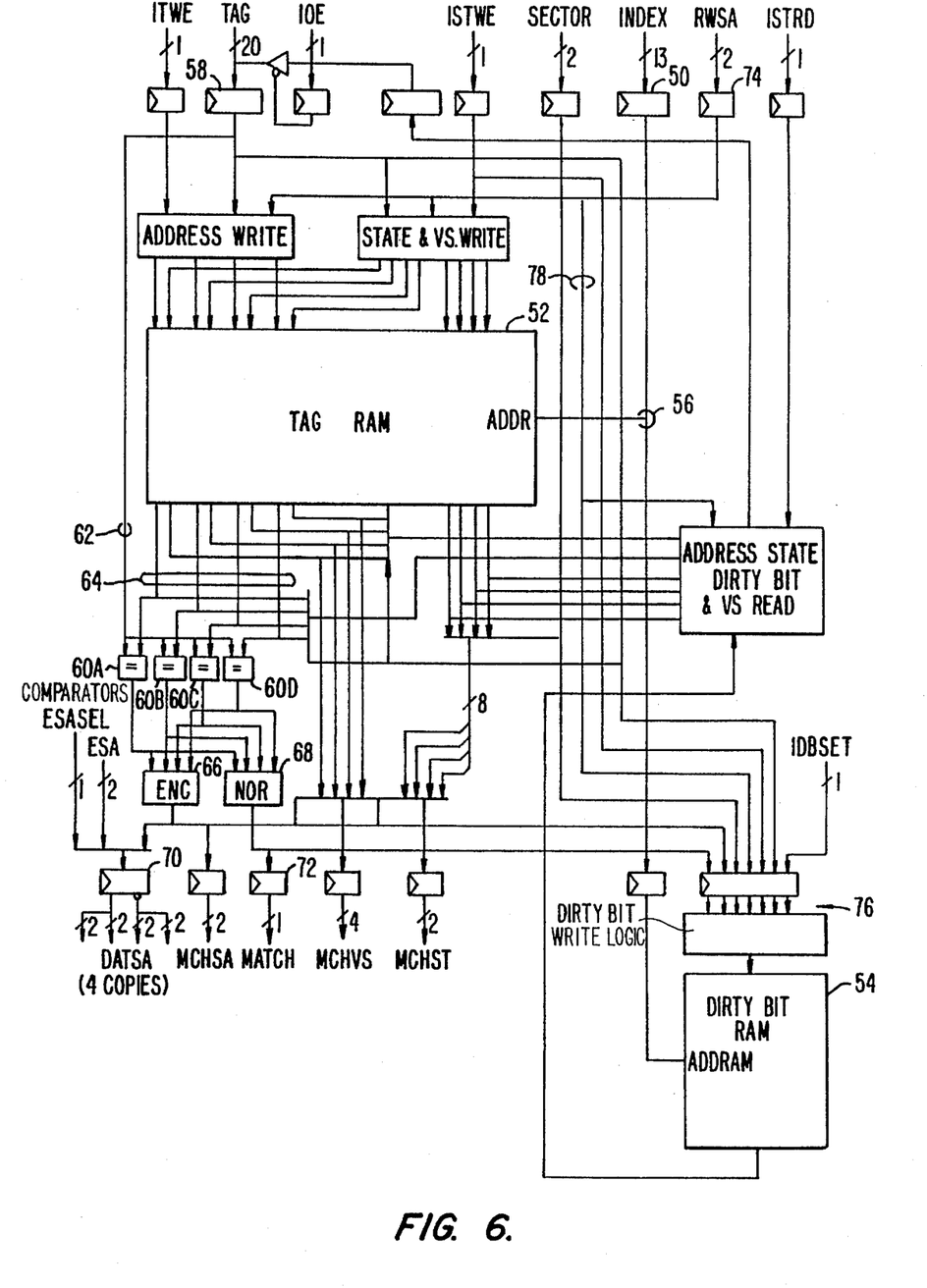
FIG. 6 is a detailed diagram of a custom TAG RAM.

Referring to FIG. 6, an INDEX register 50 is coupled to the ADDR input of a TAG RAM 52 and DIRTY BIT RAM 54 by an INDEX bus 56. A TAG register 58 is coupled to a first input of each of four comparators 60A-D by a TAG bus 62. A second input of each comparator 60A-D is coupled, respectively, to a TAG-OUT output of the TAG RAM 52 by a TAG-OUT bus 64. The outputs of comparators 60A-D are routed to the inputs of an ENCODER 66 and a NOR gate 68. The output of the ENCODER 66 is routed to a SET-SELECT register 70 and the output of the NOR gate 68 is routed to a MATCH register 72. A cache read/write signal (RWSA) is stored in a RWSA register 74 and provided to DIRTY BIT WRITE LOGIC 76 by an RWSA bus 78. The outputs of the ENCODER and NOR gates 66 and 68 are also routed to the DIRTY BIT WRITE LOGIC 76.

When a given physical address is provided by the IU 10, its TAG field is stored in the TAG register 58 and its INDEX field is stored in the INDEX register 50. The storage location in the TAG RAM 52 accessed by the INDEX field stores the TAG field associated with cache data stored in each of the 4 lines in the associative set that can be accessed by the INDEX field. The TAG RAM 52 is organized so that the TAG field of data stored in the first line of the associative set is provided to the second input of first comparator 60A, the second line of the associative set to the second comparator 60B, and so on.

If the TAG data supplied to the second input of any comparator 60A–D matches the TAG field stored in the TAG register 58, then the comparator output is logic "1". Otherwise, the comparator output is logic "0".

The NOR gate 68 receives the comparator outputs and generates a "0" if any of its inputs is a logic one ("1"). Thus, a "0" output by the NOR gate indicates a hit, i.e., that the block of data specified by the entire physical address is stored in the global cache 14.

When the cache is hit, the ENCODER 66 outputs a two-bit set select signal specifying which line within the set contains the data specified by the given entire physical address. The TAG RAM 52, comparators 60A–D, and encoder 66 thus form a select signal generator for generating a set select signal. This set select signal functions as the two high-order bits given to the SSRAM chips forming the global cache data store 30. Thus, as described above, the generation of hit/miss data and set-specifying information occurs during the H stage of the global cache pipeline, requiring a single machine cycle.

As is well known in the art, if data specified by the entire physical address is not stored in the cache then the data from the external main memory 27 is written to the cache and replaces data previously stored in the cache. If the replaced data in the cache has not been modified since it was transferred from the external main memory 27 to the cache, then the data in the cache and external main memory 27 are the same (i.e., the data is coherent). Accordingly, the cache data can be replaced without problem because the same data is stored in the external main memory 27 and can be accessed when needed. However, if the replaced data in the cache has been modified by a write operation, then it is no longer coherent with the data stored in external main memory 27. Thus, before replacing the data in the cache the cache data is stored in a writeback operation so that the correct data is stored in the external main memory 27 and can be accessed by the processor. Accordingly, when data in the cache is modified by a write operation a "dirty bit" associated with the data is cleared to indicate that the data is "dirty" ( i.e., is no longer coherent with data stored in the external main memory).

In FIG. 6, whenever the RWSA signal indicates that data is to be written to the cache and the MATCH signal indicates a cache hit, a dirty bit stored in a DIRTY BIT RAM storage location accessed by the INDEX field is cleared. Thus, dirty bit processing requires a single machine cycle and occurs during the J stage of the global cache pipeline.

The system described in FIG. 6 is utilized to indicate a lack of coherency between data stored in the global cache 14 and data stored in the external main memory 27. However, because of the unique organization of the split level cache, a system for indicating a lack of coherency between the local cache 12 and the global cache 14 is also required.

As described above, the IU 10 utilizes the local cache 12 as the primary cache and the global cache 14 as a secondary cache. The FPU 20 utilizes the global cache 14 as the primary cache and does not utilize the local cache 12 at all. If the same data is stored in both caches 12 and 14, there are two sources of incoherency. The first source is a modification of only local cache data by an IU write to the local cache 12 and the second source is a modification of only global cache data by an FPU write to the global cache 14.

The first source of incoherency is solved by a write through operation: data written to the local cache 12 is also "written through" to the global cache 14. The write through operation is possible because of the very high write bandwidth of the global cache 14. No external buffer is required because the global cache 14 can absorb write through at full bandwidth.

The second source of incoherency is unique to the split level cache system and results in incoherence between integer and floating point data. The problem is that while IU loads and stores access both the local cache 12 and global cache 14, FPU loads and stores only access the global cache 14. Thus, for example, if a particular memory location is first written by an IU store and then rewritten by an FPU store then a subsequent IU load would get stale data from the local cache 14 unless something is done.

Although a direct solution would be to invalidate a cache line in the local cache 12 whenever an FPU store occurred, the problem is further complicated by the fact that each cache line holds several words and a particular cache line may contain a mix of floating point data and integer data. If a program first accesses integer character data causing the particular cache line to be loaded to the local cache 12, then a subsequent floating point store would invalidate the entire line. However, in that case the integer data in the particular cache line in local cache 12 would still be valid but, since the line has been invalidated, another reference to the integer data in the given line would cause another cache miss requiring that the particular cache line again be loaded to the local cache. Graphics applications are particularly likely to exhibit this behavior, as mixed integer and floating point structures are common. Since cache performance depends in large measure upon the frequency with which new data must be loaded into the cache, invalidating the entire local cache line would lead to poor performance.

The solution utilized in the preferred embodiment is to attach a valid bit to each word in every cache line in the local cache 12, thereby providing finer granularity to the valid bits. During an FPU store operation, the address is provided to both the local cache 12 and global cache 14. If the addressed data is in the local cache, the valid bit attached to the addressed word is cleared to indicate a lack of coherency between the modified word in the local cache 12 and global cache 14. The valid bit attached to the particular word accessed during an IU store is set to indicate coherence between the caches 12 and 14 due to the above-described write through operation.

This solution allows the IU to access data freely from the local cache without fear of accessing stale data because any floating point data which had been modified by an FPU write would have a cleared valid bit attached thereto. Therefore, performance losses due to unnecessary cache loads are minimized.

The clearing of the valid bit in the local cache 12 during a floating point store operation will now be described with reference to FIG. 7. In the preferred embodiment, the local cache 12 is dual-ported to support either two loads or one load and one store per cycle. The local cache 12 is a 16 KB direct-mapped cache with each line holding 32 bytes organized into 8 words. The local cache 12 is refilled from the global cache 14 in 7 machine cycles. The local cache 12 is virtually addressed and physically tagged and is a subset of the global cache 14.

Figure 7:
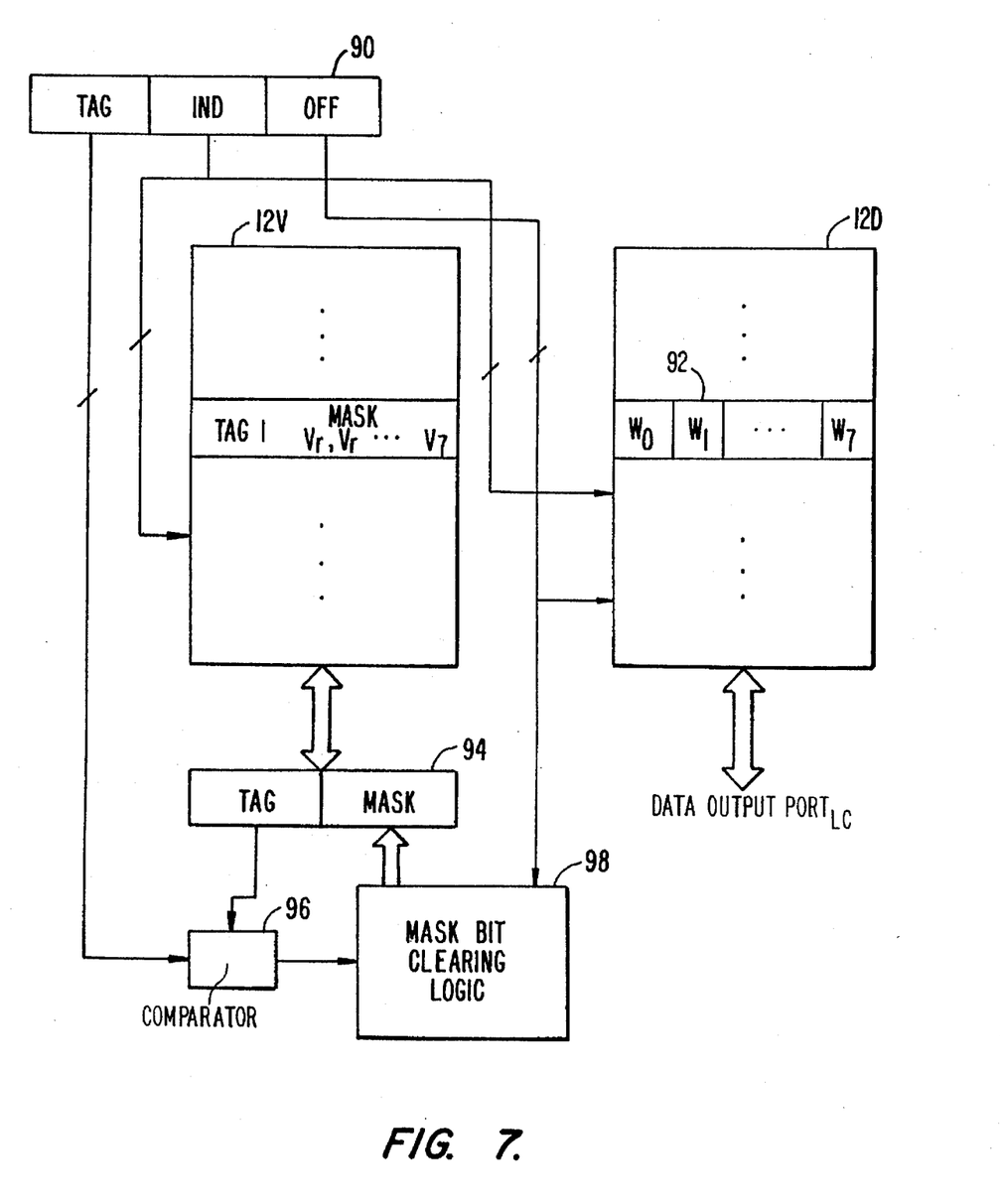
FIG. 7 is a logical diagram of the on-chip local cache.

In FIG. 7 the virtual address output by the address generator 38 of the IU 10 (see FIG. 2) is held in a first holding register 90. The local cache 12 is shown logically divided into a VRAM 12V and a data store 12D. Each cache line 92 in the data store 12D includes 8 word positions, each holding four bytes of data. The INDEX field of the virtual address accesses a TAG field and a MASK field from a storage location in the VRAM 12V and a cache line in the data store 12D. The OFF field of the virtual address specifies a particular word position in the cache line 92. The TAG field and MASK field read from the VRAM 12V are held in a second holding register 94. The TAG field accessed from the VRAM 12V corresponds to the high order bits of the physical address of the data held in the cache line 92. The accessed MASK field holds eight valid bits, each attached to a corresponding word in the cache line 92. The TAG field held in the second holding register 94 is provided to the first input of a comparator 96 and the TAG field of the virtual address is provided to the second input of the comparator 96. A MASK BIT CLEARING LOGIC 98 is coupled to the portion of the second holding register 94 storing the MASK, the OFF field of the virtual address, and the output of comparator 96.

During a floating point store operation to a location specified by the virtual address held in the first holding register 90, the TAG field and MASK field are accessed from the VRAM 12V during a first machine cycle. If the accessed TAG field matches the TAG field of the virtual address, the comparator output enables the MASK BIT CLEARING LOGIC to clear the valid bit held in the second holding register 94 which corresponds to the word in the cache line 92 specified by the OFF field of the virtual address. This match indicates that the floating point data will be modified in the global cache 14, and that the word of data specified by the virtual address will no longer be coherent. Thus, the clearing of the valid bit in the MASK field invalidates this word in the local cache 12. During the next clock cycle the modified MASK field, including the cleared valid bit, is written back to the storage location in the VRAM 12V specified by the INDEX field of the virtual address.

Figure 8:
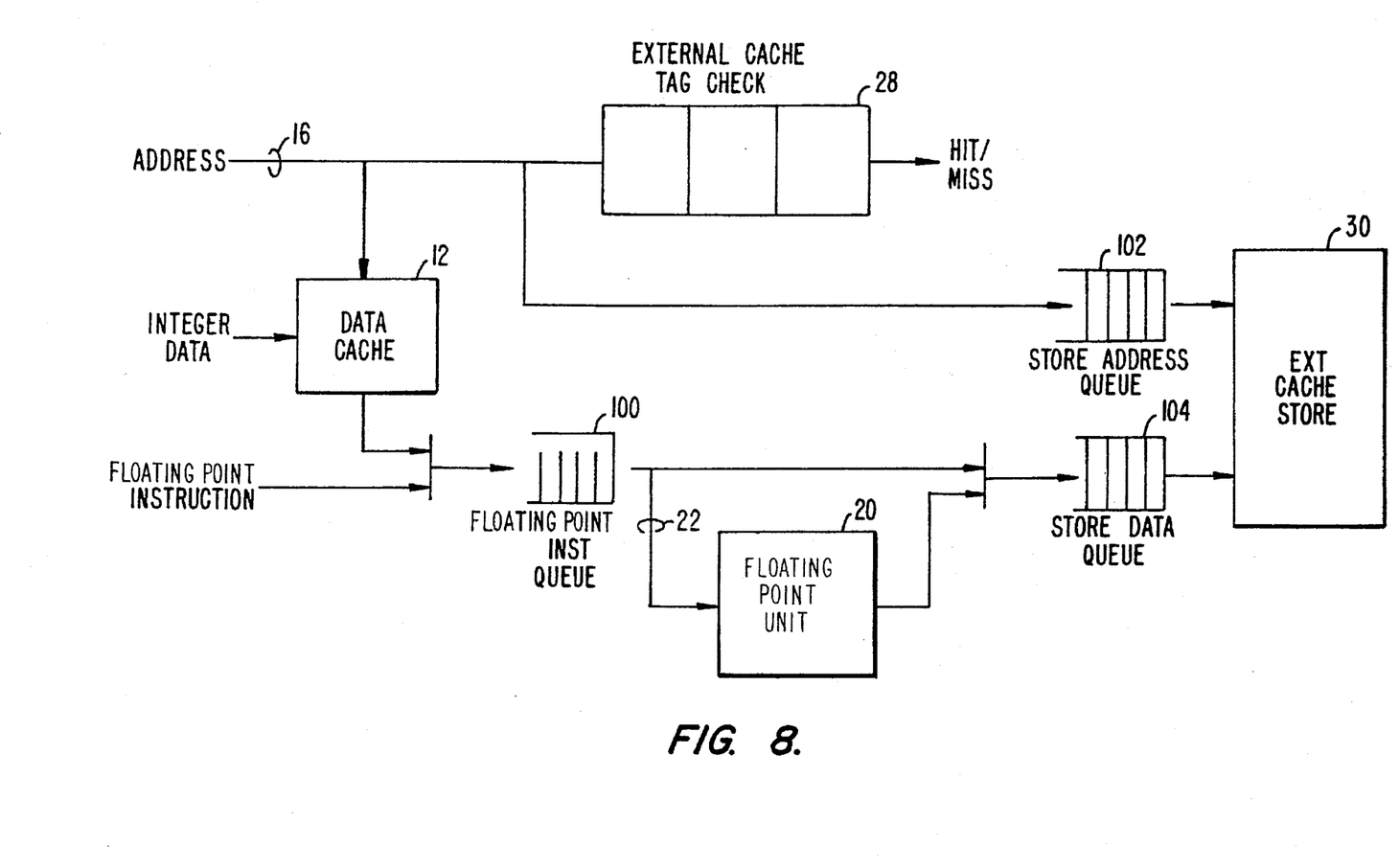
FIG. 8 is a block diagram of the store data paths.

The write through operation for integer data stored in the local cache 12 will now be described in detail with reference to FIG. 8. In the preferred embodiment floating point instructions, addresses, and data are enqueued to compensate for the latency of the global cache 14 and the FPU 20. Additionally, there is no direct store data path from the IU 10 to the global cache 14. Accordingly, for an IU store operation the local cache 12 transfers the data stored to an FP instruction queue 100 and the data is dispatched to the FPU 20 over the TBUS 22 and encoded as write-through data. Additionally, the physical address of the write-through data is transferred to a store address queue 102. The FPU 20 recognizes the write-through data and bypasses it to a store data queue 104. The timing of the queues is arranged so that the address of the write-through data and the write-through data are fed to the global cache data store 30 during the same machine cycle.

The invention has now been describe with reference to the preferred embodiments. However, modifications and substitutions will now be apparent to persons of skill in the art. For example, in the preferred embodiment the local cache is implemented on the same chip as the IU and global cache is implemented off-chip utilizing commodity SSRAMs. However, as technology changes it will be possible to implement a small, short latency cache off chip and a large, higher latency cache on chip. However, the principles of the invention would still be applicable to such alternative arrangements. Accordingly, it is not intended to limit the scope of the claims except as provided by the appended claims.

What is claimed is:

1. A split level cache memory system in a data processor comprising:

an integer unit, having a data input port$_{IU}$ and a data output port$_{IU}$;

a floating point unit, having a data input port$_{FPU}$ and a data output port$_{FPU}$;

a first memory cache, for storing integer and address data to be processed by said integer unit, having a data output port$_{LC}$ coupled to said data input port$_{LC}$ for transferring integer and address data to said integer unit, and a data input port$_{LC}$ coupled to said data output port$_{IU}$ for receiving integer and address data from said integer unit; and a second memory cache, for storing said integer and address data to be processed by said integer unit and for storing floating point data to be processed by said floating point unit, having a data input port$_{GC}$ coupled to said data output port$_{FPU}$ for receiving floating point data from said floating point unit, said data input port$_{GC}$ further coupled to said data output port$_{LC}$ for receiving integer and address data from said first memory cache, and a data output port$_{GC}$ coupled to said data input port$_{FPU}$ for transferring floating point data to said floating point unit, said data output port$_{GC}$ further coupled to said data input port$_{LC}$ for transferring integer and address data to said first memory cache.

2. The split level cache memory system of claim 1 further comprising:

an external main memory for storing integer, address, and floating point data, having a data input/output port coupled to said data input port$_{GC}$ for transferring said integer, address, and floating point data to said second memory cache, said data input/output port further coupled to said data output port$_{GC}$ for receiving integer, address, and floating point data from said second memory cache.

3. The split level cache memory system of claim 2 wherein a first copy of a specific cache line is stored in the first cache memory and a second copy of the specific cache line is stored in the second cache memory, with the specific cache line including a plurality of words including integer, address, and floating point data, wherein said first memory cache further comprises:

a first data store for storing said first copy of the specific cache line; and wherein said second memory cache further comprises:

a second data store for storing said second copy of the specific cache line; and further comprising:

means for writing an integer store operation through to said second memory cache whenever said integer unit issues said integer store operation to said first memory cache for modifying a particular word in said first copy of the specific cache line, so that the particular word in both copies of the specific cache line are coherent.

4. The split level cache memory system of claim 3, wherein said first memory cache further comprises:

a mask field, coupled to said first data store, having a unique valid bit attached to each word in said first copy of the specific cache line stored in said first data store;

a mask bit clearing logic, coupled to said mask field, for clearing the valid bit attached to a floating point word in said first copy of the specific cache line if the same floating point word in the second copy of the cache line is modified by a floating point store operation, and for setting the valid bit attached to an integer word in said first copy of the specific cache line if the integer word is modified by an integer store operation.

5. A method for the coherent storage of integer and floating point data used by a split level cache memory system in a data processor, comprising the steps of:

storing a first set of data in a first memory cache, where said first set of data comprises integer, address, and floating point data;

accessing, via a floating point unit, the floating point data from said first set of data;

storing a second set of data in a second memory cache, where said second set of data comprises integer, address, and floating point data, and where said second set of data is a subset of said first set of data;

accessing, via an integer unit, the integer and address data from said second set of data, and the integer and address data from said first set of data when said integer unit fails to find data within said second set of data;

setting a valid bit attached to a first specific word of data in said second set of data whenever said integer unit modifies said first specific word of data;

clearing a valid bit attached to a second specific word of data in said second set of data whenever said floating point unit modifies said second specific word of data in said first set of data; and writing all integer store operations through to said first memory cache whenever said integer unit issues an integer store operation to said second memory cache, so that integer and address data modified by said integer store operations remains coherent in both the first and second set of data.

\* \* \* \* \*